Oct. 17, 1933.  D. E. RENSHAW ET AL  1,930,539
THERMAL CONTROL DEVICE
Filed Dec. 19, 1930
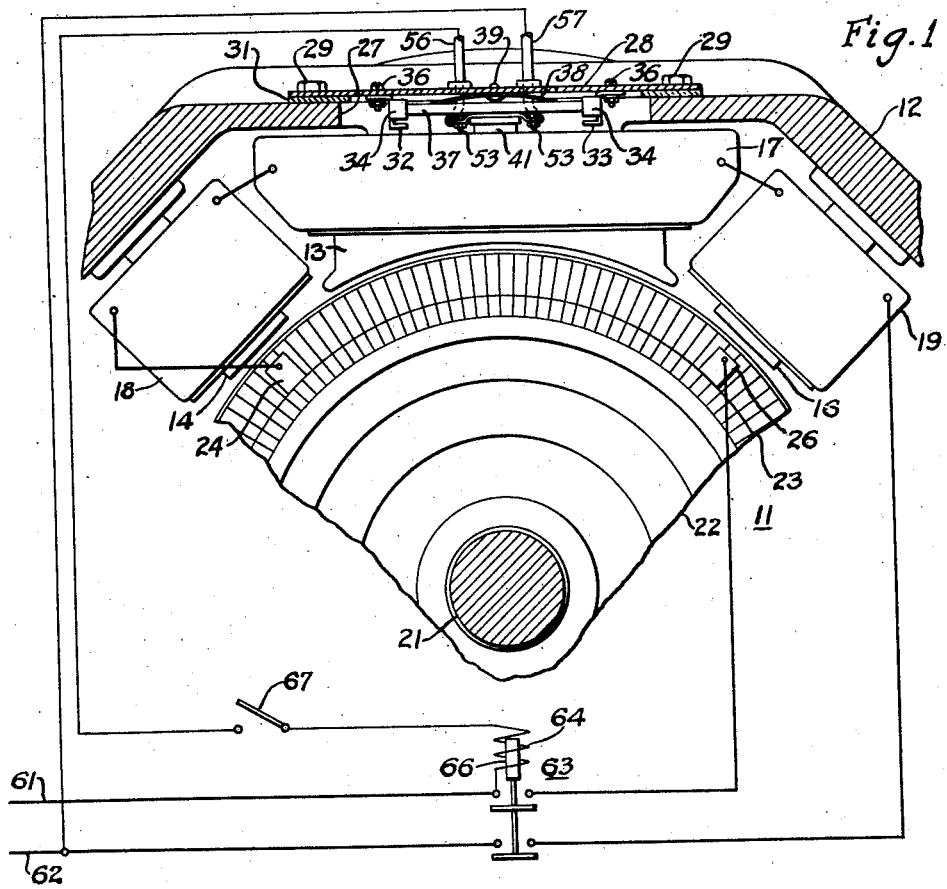
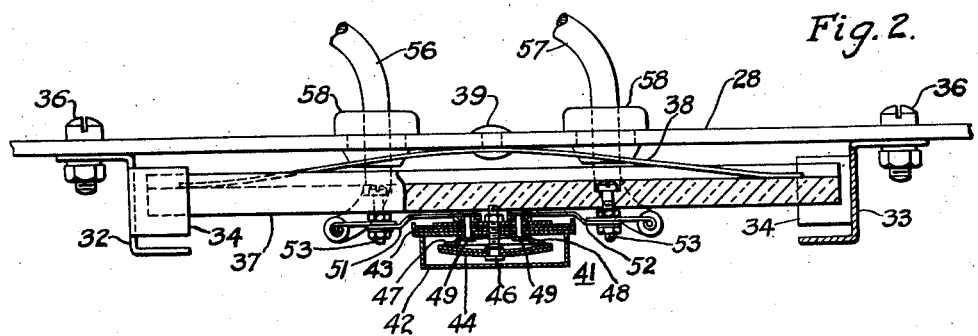
WITNESSES:
Leon J. Taza
H M Biebel
INVENTORS.
David E. Renshaw, and
Herman L. Thomas.
BY
Chesley G. Carr
ATTORNEY Patented Oct. 17, 1933

1,930,539

UNITED STATES PATENT OFFICE 1,930,539

THERMAL CONTROL DEVICE

David E. Renshaw, Wilkinsburg, and Herman L. Thomas, Turtle Creek, Pa., assignors to Westinghouse Electric and Manufacturing Company, a corporation of Pennsylvania Application December 19, 1930
Serial No. 503,388

3 Claims. (Cl. 172—36)

Our invention relates to control devices and more particularly to thermal control devices and systems.

An object of our invention is to provide a relatively simple, easily installed-and-removed thermally-actuable device for controlling the energization of an energy-translating device embodying an energizing coil.

In practicing our invention, we provide, in cooperation with an energy translating device having an energizing coil and a casing for the device, a thermal control device mounted on a removable cover and spring-pressed against the energizing coil when the cover is in its proper operative position.

In the single sheet of drawing,

Figure 1 is a view, partially in end elevation and partially in section, through an energy-translating device with which is associated the thermal control device embodying our invention, and Fig. 2 is a view, partially in side elevation and partially in longitudinal section, through a thermal relay embodying our invention.

While we have illustrated a particular embodiment of an energy-translating device, including a casing having an opening therein that is normally closed by a removable cover, and an energizing coil traversed by the load current of the device, we desire it to be understood that this is for illustrative purposes only and that the device embodying our invention may be used on other energy-translating devices, such as transformers or dynamo-electric machines.

Referring more particularly to Fig. 1 of the drawing, we have there shown a dynamo-electric machine 11 including a metal casing 12, a portion only of which is shown for the sake of clearness, a plurality of main poles 13, only one of which is shown in the drawing, and a pair of commutating or inter-poles 14 and 16, the main poles 13 having an energizing winding 17 thereon and the commutating poles having energizing coils 18 and 19 thereon, all of which coils are traversed by the load current of the dynamo-electric machine or by a current proportional to the load current.

A rotor shaft 21 has a rotor 22 mounted thereon, including a commutator 23, commutator brushes 24 and 26 being shown schematically as engaging the commutator member. We have elected not to show the brush holders, not only because they constitute no part of the present inventiton but also for the sake of greater clearness.

The motor housing 12 is provided with an aperture or opening 27 therein, such as is usually provided in completely encased dynamo-electric machines for other purposes. A cover 28 of metal is removably secured, as by bolts 29, to the casing, a gasket 31 being provided in order to make the closure dust-and-moisture tight.

A pair of guides 32 and 33, shown more particularly in Fig. 2 of the drawing, and each being of substantially Z-shape, in section with, and having lateral side portions 34 integral with the intermediate portion secured, by short bolts 36, to the inside face of cover 28, in a manner shown in Fig. 2. A supporting plate 37, which is preferably made of electric-insulating material and may be of substantially rectangular shape, has its ends located between the side members 34 of the guides 32 and 33 and is yieldingly pressed away from the cover 28 by a spring 38 which is of substantially leaf shape and is secured against the inside of the cover by a rivet 39 at substantially its midpoint.

A thermostatic switch 41 is located adjacent to the inner surface of supporting plate 37 and includes a metal casing 42 which may be made of aluminum, a base 43 of substantially circular shape, a bimetal disc 44 which is preferably made in accordance with the teachings of Patent No. 1,448,240 issued to J. A. Spencer and which has a snap action from one of its limiting positions to its other limiting position and which also has a relatively large temperature differential between the two temperature values at which the disc will operate. The disc 44 is supported on a central stud 46 having screw-thread engagement with the base 43. Two substantially semi-annular contact members 47 and 48 are insulatedly mounted upon the base 43 and, when the disc is in the position shown in Fig. 2, these fixed contact members are engaged by the disc, and any current traversing the thermal relay 41 will also traverse the bimetallic disc 44.

The fixed contact terminals 47 and 48 may be held by rivets 49, and each of terminal straps 51 and 52 has one end secured to a corresponding rivet 49 to extend radially outward, substantially as shown in Fig. 2 of the drawing.

The thermostatic switch or relay 41 is supported adjacent to the plate 37 by a pair of screws 53 which extend through the plate 37 and through the terminal straps 51 and 52, respectively, nuts being located on the screws 53, in the usual manner, to hold the terminal straps, as well as the ends of conductors 56 and 57 which extend through suitable bushings 58 of electric-insulating material, with which the plate 28 is provided, and through the supporting plate 37.

Referring to Fig. 1 of the drawing, we have there shown an energizing circuit including supply-circuit conductors 61 and 62, an electro-magnetic circuit-controlling device 63, including an actuating coil 64, an armature core 66 and contact-bridging members of the usual kind for controlling the energizing circuit of device 11. A manually operable switch 67 is provided in the circuit of the actuating coil 64 and of the thermostatic switch 41 in order to permit of manually energizing or deenergizing the energy-translating device.

As has already been stated, the energizing coil 17 is traversed either by the entire current traversing the device 11 or by a current proportional thereto, and the temperature rise of an energizing coil, thus energized, will be a very good measure and indication of the temperature of the translating device, and any thermostatic switch controlled in accordance with the temperature of such energizing coil will properly protect the energy-translating device against danger of burn out by reason of excessive or long continued overloads thereon.

The thermostatic switch, particularly embodying our invention, may be located in its proper operative position against the inside face of a cover either during the initial manufacture and assembly of the encased energy-translating device or it may be applied thereto even after the initial manufacture or installation of the device, as the operations required for the installation of the thermal device on the cover are few and simple.

When the cover is placed in its proper operative position, substantially as shown in Fig. 1 of the drawing, the casing 42 will be yieldingly pressed against a surface of the energizing coil 17, it being, of course, understood that the opening 27 is provided in the casing 12 in such position that, when the cover is placed over the opening 27, the casing 42 of the thermostatic switch will be in operative engagement with the energizing coil 17. Heat will, therefore, be transmitted from the coil to the casing 42 and to the disc 44 to raise its temperature and, if the temperature rise of coil 17 continues to or near a dangerous value, the disc 44 will be operated to open the energizing circuit of coil 64 which will, therefore, interrupt the circuit of the energy-translating device 11.

It has already been stated that there is a large difference in the operating values of the temperature at which the bimetal disc 44 will be actuated from one position to another and this is of value in a control system of this kind, as it will be impossible for an operator to immediately reclose the energizing circuit of the device 11 if it has been deenergized because of an excessive temperature rise therein. In other words, the motor, in the illustration shown in the drawing, or an equivalent energy-translating device, must remain deenergized for a sufficient length of time to permit the temperature therein to drop through a relatively large amount, that is, the energy-translating device must be permitted to cool appreciably before it can be again connected to the supply circuit. Thus, if the upper value of the temperature at which the disc will operate is 80° C., it will not operate to reclose the circuit until the temperature has dropped to say 65° C. or 60° C., that is, there will be a decrease in the temperature of about 15% before the disc will be actuated to its original position. This ensures a greater factor of safety for the energy-translating device which is of particular value in those applications where an operator may be an entirely untrained person with little comprehension as to the factors entering into the proper care of a motor, and intent only upon getting out the work which the motor may be set to do.

The device embodying our invention thus provides a relatively simple and easily installed thermostatic switch which is applicable to an entirely-encased energy-translating device having an energizing coil traversed by the load current or by a portion of the load current and effective not only to cause deenergization of the motor, transformer, etc., but also to prevent the immediate reenergization thereof after having been disconnected from the supply circuit because of excessive temperature rise.

Various modifications may be made in our invention without departing from the spirit and scope thereof. We desire, therefore, that only such limitations shall be placed thereon as are imposed by the prior art or are set forth in the appended claims.

We claim as our invention:

1. In combination with an energy-translating device having an energizing winding, a casing therefor having an opening therein adjacent to said energizing winding and a removable cover for said opening, thermally-actuable means including a thermostatic switch having a casing operatively engaging the energizing winding, a movable support for the thermostatic switch, guide means for the movable support mounted on the cover, and a resilient member for yieldingly pressing the movable support and the thermostatic switch away from the cover.

2. In combination with an energy-translating device having an energizing winding, a casing therefor having an opening therein adjacent to said energizing winding and a removable cover for said opening, thermally-actuable means including a movable supporting plate adjacent to the inside of the cover, movement-guiding and limiting means for said supporting plate mounted on the cover, a spring between the cover and the supporting plate for yieldingly forcing the supporting plate away from the cover, a thermal switch including a metal casing normally pressed against a surface of the energizing winding by the action of said spring, a bimetal element, contact terminals for the switch extending beyond the casing, and means for securing the thermal switch to the supporting plate.

3. In combination with an energy-translating device having an energizing winding, an enclosing casing for the device, said casing having an opening therein adjacent to the energizing winding and a removable cover for the opening in said casing, thermally-actuable means including a thermostatic switch supported from the inside of said cover and spring pressed against the energizing winding when the cover is located on the casing to close the opening therein.

DAVID E. RENSHAW.
HERMAN L. THOMAS.